(12) United States Patent
Eida et al.

(10) Patent No.: US 7,523,160 B2
(45) Date of Patent: Apr. 21, 2009

(54) INFORMATION PROVISION EXCHANGE SERVICE SYSTEM AND METHOD, PROGRAM FOR IMPLEMENTING THE METHOD, AND STORAGE MEDIUM STORING THE PROGRAM

(75) Inventors: Masataka Eida, Kanagawa (JP); Hajime Kaneko, Tokyo (JP)

(73) Assignee: Canon Kabushiki Kaisha (JP)

( * ) Notice: Subject to any disclaimer, the term of this patent is extended or adjusted under 35 U.S.C. 154(b) by 840 days.

(21) Appl. No.: 10/778,266

(22) Filed: Feb. 12, 2004

(65) Prior Publication Data

US 2004/0162904 A1 Aug. 19, 2004

(30) Foreign Application Priority Data

Feb. 13, 2003 (JP) ............................. 2003-035437

(51) Int. Cl.
G06F 15/16 (2006.01)
(52) U.S. Cl. ...................... 709/204; 380/282; 375/142; 709/203; 709/224
(58) Field of Classification Search ......... 709/202–204; 375/142
See application file for complete search history.

(56) References Cited

U.S. PATENT DOCUMENTS

| 6,229,825 B1 * | 5/2001 | Nitta et al. ................... 370/498 |
| 6,871,213 B1 * | 3/2005 | Graham et al. ............... 709/205 |
| 6,948,070 B1 * | 9/2005 | Ginter et al. ................ 713/193 |
| 6,963,850 B1 * | 11/2005 | Bezos et al. .................. 705/26 |
| 6,973,481 B2 * | 12/2005 | MacIntosh et al. ........... 709/206 |
| 7,054,906 B2 * | 5/2006 | Levosky ...................... 709/206 |
| 7,181,017 B1 * | 2/2007 | Nagel et al. .................. 380/282 |
| 7,246,150 B1 * | 7/2007 | Donoho et al. ............... 709/204 |
| 7,254,608 B2 * | 8/2007 | Yeager et al. ................ 709/203 |
| 2003/0018559 A1 * | 1/2003 | Chung et al. ................... 705/37 |

FOREIGN PATENT DOCUMENTS

| JP | 06-161704 A | 6/1994 |
| JP | 10-257189 A | 9/1998 |
| JP | 11-184786 A | 7/1999 |
| JP | 11-352993 A | 12/1999 |
| JP | 2000-057374 | 2/2000 |
| JP | 2000-115153 A | 4/2000 |
| JP | 2002-170104 A | 6/2002 |

\* cited by examiner

Primary Examiner—Don Wong
Assistant Examiner—Tuan-Khanh Phan
(74) Attorney, Agent, or Firm—Rossi, Kimms & McDowell LLP

(57) ABSTRACT

An information provision exchange service system that can securely prevent the transmission of information that can be used to identify a user to another party and enable users to provide and exchange information between themselves free from confidentiality concerns. A server checks registered personal information to determine whether or not information that can be used to identify any of the users using a plurality of communication terminals is included in information exchanged between the communication terminals via a communication network, and replaces the information that can be used to identify a user with other information if the information that can be used to identify the user is detected in the information exchanged between the communication terminals via the communication network.

13 Claims, 6 Drawing Sheets

INFORMATION PROVISION EXCHANGE SERVICE SYSTEM AND METHOD, PROGRAM FOR IMPLEMENTING THE METHOD, AND STORAGE MEDIUM STORING THE PROGRAM

BACKGROUND OF THE INVENTION

1. Field of the Invention

The present invention relates to an information provision exchange service system and method, a program for implementing the method, and a storage medium storing the program, and more particularly, to an information provision exchange service system and method that provides, via a communications network, an information provision exchange service to all communication terminal subscribers by mediating the exchange of information between a plurality of communication terminals each one of which is allocated to a particular subscriber, and a program for implementing the method, and a storage medium storing the program.

2. Description of the Related Art

Generally, as services that provide information using a communication network, a wide array of information provision services exist, including interactive television services, telephone fax information provision services, and internet information provision services. The interactive television service is a service that provides information indiscriminately to a large number of unspecified individuals without specifying the recipient of information. For this reason, among the individuals to which the information is provided there exist those for whom the provided information is useful and appropriate and those for whom it is not.

With information provision services by using telephone faxes and the like, when the recipient is in a position to receive the information, information is provided to the recipient unilaterally. For example, even if this telephone fax information provision service provides only voice data, a recipient is designated by an information provider who is unknown to the recipient and information is provided from the information provider to the recipient. The designation of the recipient means designation of the telephone number of the recipient. Accordingly, it is possible for the recipient or the information provider (the sender), or both, to identify a particular individual from the telephone number. This state of affairs, although ordinarily beneficial to the information provider, when the recipient denies or refuses the information, or when the recipient is slandered, in many cases puts the recipient in an uncomfortable or disadvantageous position, particularly uncomfortable psychologically.

As an information provision service type that has partially solved these disadvantages and defects, there is an internet-based bulletin board-like information provision exchange service. According to this method, normally called a chat room, individuals who subscribe to an internet connection service provided by an internet services provider have individual fictitious names under which they provide information to an information provision area (site) called an internet bulletin board and are provided with information from such site. This type of technology is introduced, for example, in Japanese Laid-Open Patent Publication (Kokai) No. 10-257189, Japanese Laid-Open Patent Publication (Kokai) No. 11-184786, Japanese Laid-Open Patent Publication (Kokai) No. 2000-115153 and Japanese Laid-Open Patent Publication (Kokai) No. 2000-57374. In Japanese Laid-Open Patent Publication (Kokai) No. 2000-57374, a fictitious other self called avatar is allowed to participate, carrying out conversations and exchanging information.

Moreover, as places to provide information and to receive information there are also ordinary cellular telephone e-mail sites and I-mode (registered trademark) sites.

However, with the technology described in Japanese Laid-Open Patent Publication (Kokai) No. 2000-57374, even though an individual might be using a fictitious name, if information in the form of criticism or slander is directed toward the individual behind the fictitious name, that fictitiously named person might be put in an extremely disadvantageous position, and might even be forced to withdraw from the site or to change his or her fictitious name to a new fictitious name.

Moreover, with a site like that described above, if information that can identify an individual, such as the individual's name or telephone number, is mistakenly leaked by a sender, the sender runs the risk of being heavily disadvantaged. Further, in Japanese Laid-Open Patent Publication (Kokai) No. 2000-57374, although a technology is described of chat room participants getting together to form a group and to meet and for preventing information on those within the group from being leaked to others who connected to the network and are not members of the group (others who have entered the group), there is no mention of any technology for shielding or preventing leakage of information that can be used to identify individuals within that group (that is, two or more chat room participants).

Further, in a chat service, participants enter the chat room under fictitious names that do not identify individuals, and therefore an environment is created in which it is easy for participants to make slanderous statements. Accordingly, if the name of an individual who has made slanderous statements becomes known to the other participants, then that individual runs the risk of being exposed to many and great disadvantages.

Further, a major problem arises whenever someone uses an actual personage's name and that personage then virtually slanders that actual person, causing that the actual person to suffer damage or injury.

Moreover, with the widespread diffusion of Internet connection terminals (that is, personal computers and the like) and cellular telephones, etc., minors such as grade-school children are included among the users of these terminals. There is a risk that, among users such as these, the very young (such as the grade-schoolers noted above) will give away information that should be kept confidential, such as actual names, addresses, by sending and receiving e-mail messages or by accessing internet sites via cellular telephones or the like. Moreover, crimes committed by minors through accessing sites that contravene public morals have become a serious social problem.

Thus, as described above, although the use of the Internet and of convenient information communications devices such as cellular telephones makes it possible to enjoy easy and convenient conversation, talking with a large number of unidentified parties creates many risks of leaking of confidential personal information, which chills the enjoyment of such easy conversation. Moreover, although limiting the exchange of information only to acquaintances eliminates the need for vigilance against the loss of confidential personal information, such a limitation cannot be said to afford maximum advantage of the opportunities offered by the Internet and cellular telephone e-mail messaging for exchanging information with an unlimited number of people.

SUMMARY OF THE INVENTION

It is an object of the present invention to provide an information provision exchange service system and method that can securely prevent the transmission of information that can be used to identify a user, to another party and enable users to provide and exchange information between themselves free from confidentiality concerns, and a program for implementing the method, and a storage medium storing the program.

To attain the above-described object, in a first aspect of the present invention, there is provided an information provision exchange system comprising a plurality of communication terminals, each of the communication terminals being allocated to one of a plurality of subscribers, a communication network that communicably connects the plurality of communication terminals to each other, and a server that mediates information exchange between the plurality of communication terminals via the communication network, the server comprising a personal information registration device that registers personal information for each of a plurality of users using the communication terminals, a detection device that checks the registered personal information to determine whether or not information that can be used to identify any of the users of the communication terminals is included in information exchanged between the plurality of communication terminals via the communication network, and a changing device that is operable when the information that can be used to identify any of the users of the communication terminals is detected in the information exchanged between the communication terminals via the communication network, to replace the information that can be used to identify the user with other information.

According to the arrangement described above, the server checks registered personal information in order to determine whether or not information that can be used to identify any of the users of the communication terminals is included in information exchanged among the communication terminals via the communication network, and, if such information is detected, the server replaces that information with other information. As a result, information that can be used to identify a user can be securely prevented from being transmitted to the other party, therefore enabling users to provide and exchange information between themselves free from confidentiality concerns.

Preferably, the detection device performs an identification process on information transmitted from the communication terminals and determines whether or not information corresponding to the personal information registered for any of the users of the particular communication terminals is included in the information transmitted from the communication terminals based on results of the identification process.

Preferably, the information exchanged between the plurality of communication terminals via the communication network includes at least one of voice data and text data, and the identification process performed by the detection device comprises identifying the at least one of voice data and text data.

Preferably, the changing device is operable when the detection means detects that information corresponding to the personal information registered for any of the users of the communication terminals is included in the information transmitted from the communication terminals, to replace the information corresponding to the personal information registered for the user with corresponding fictitious personal information.

Preferably, the server comprises a fictitious personal information registration device that registers fictitious personal information for each of the users, and the changing device is operable when the detection means detects that information corresponding to the personal information registered for any of the users of the communication terminals is included in the information transmitted from the communication terminals, to determine whether or not fictitious personal information corresponding to the information corresponding to the personal information registered for the user is registered, and the changing device replaces the information corresponding to the personal information with the corresponding registered fictitious personal information if the corresponding fictitious personal information.

More preferably, when fictitious personal information corresponding to the information corresponding to the personal information is not registered, the changing device generates fictitious personal information corresponding to the information corresponding to the personal information and replaces the information corresponding to the personal information with the generated fictitious personal information.

Preferably, the server comprises a determining device that determines whether or not the fictitious personal information registered by any of the users and the personal information registered by the user are dissociated and a change request device that is operable when the determining device determines that the fictitious personal information registered by the user and the personal information registered by the user are not dissociated, to request a change of at least one of the personal information of the user and the personal information.

Preferably, the server comprises a storage device that stores user reference personal information obtained from data acquired by image pickup devices located at a plurality of locations, a determining device that compares the personal information registered by the users with the user reference personal information and determines whether or not the personal information registered by the users is correct and a change request device that is operable when the determining device determines that the personal information registered by any of the users is incorrect, to request a change of the personal information for the user.

Preferably, the server comprises a communication partner setting device that finds and sets a best communication partner from among the plurality of users, for at least one of the users.

Preferably, the information exchanged between the communication terminals via the communication network includes voice data and text data, and the server comprises an expression method changing device that changes a method of expression in the voice data or the text data depending on a related one of the users.

Preferably, the server comprises a recording device that records information exchanged between the communication terminals via the communication network.

Preferably, the server comprises a charging device that charges each of the users according to a use time or an amount of information exchanged.

To attain the above-described object, in a second aspect of the present invention, there is provided a server that mediates information exchange between a plurality of communication terminals via a communication network comprising a personal information registration device that registers personal information for each of a plurality of users using the communication terminals, a detection device that checks the registered personal information to determine whether or not information that can be used to identify any of the users using the communication terminals is included in information exchanged between the communication terminals via the communication network, and a changing device that is operable when the information that can be used to identify any of the users of the communication terminals is detected in the information exchanged between the communication terminals via the communication network, to replace the information that can be used to identify the user with other information.

To attain the above-described object, in a third aspect of the present invention, there is provided an information provision exchange service provision method of causing a server to mediate information exchange between a plurality of communication terminals via a communication network, to provide an information provision exchange service for a plurality of users using the communication terminals, the method comprising the steps of registering personal information for each of the users, checking the registered personal information to determine whether or not information that can be used to identify any of the users of the communication terminals is included in information exchanged between the communication terminals via the communication network, and replacing the information that can be used to identify any of the users with other information when the information that can be used to identify the user is detected in the information exchanged between the communication terminals via the communication network.

To attain the above-described object, in a fourth aspect of the present invention, there is provided a program for causing a computer to implement an information provision exchange service system provision method of providing an information provision exchange service for users, the program being executable on a server that mediates information exchange between a plurality of communication terminals via a communication network, the program comprising a registration module for registering personal information for each of the users using the communication terminals, a detection module for checking the registered personal information to determine whether or not information that can be used to identify any of the users using the communication terminals is included in information exchanged between the communication terminals via the communication network, and a changing module for replacing the information that can be used to identify any of the users with other information when the information that can be used to identify the user is detected in the information exchanged between the communication terminals via the communication network.

To attain the above-described object, in a fifth aspect of the present invention, there is provided a server a computer-readable storage medium storing a program for implementing an information provision exchange service provision method of providing an information provision exchange service for users, the program being executable on a computer that mediates information exchange between a plurality of communication terminals via a communication network, the program comprising a registration module for registering personal information for each of the users using the communication terminals, a detection module for checking the registered personal information to determine whether or not information that can be used to identify any of the users using the communication terminals is included in information exchanged between the communication terminals via the communication network and a changing module for replacing the information that can be used to identify any of the users with other information when the information that can be used to identify the user is detected in the information exchanged between the communication terminals via the communication network.

The above and other objects, features and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing embodiments thereof.

Figure 1:
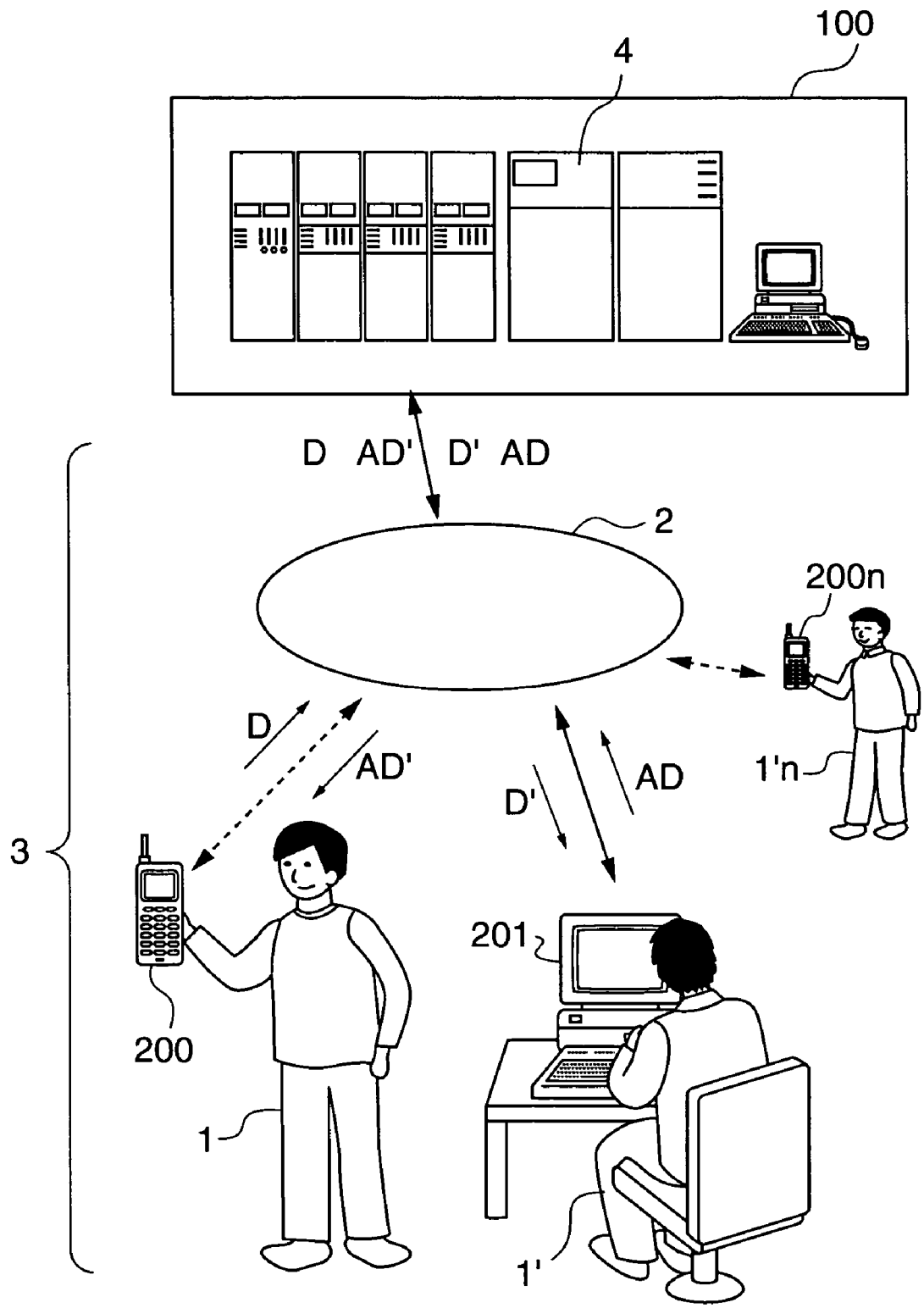
FIG. 1 is a diagram schematically showing the arrangement of an information provision exchange service system according to a first embodiment of the present invention.

FIG. 1 is a diagram schematically showing the arrangement of an information provision exchange service system according to a first embodiment of the present invention.

In the present embodiment, as shown in FIG. 1, the information provision exchange service system (hereinafter referred to as "the system") 100 manages a site (that is, a service window) 3 that enables a large number of unidentified individuals to participate and to provide and exchange information between themselves. To participate in the site 3, a person (for example, persons 1, 1' 1'n) must first connect to the site 3, through a communication network 2 such as the Internet or a cellular telephone network from their own devices, for example a cellular telephone 200, a personal computer 201, a cellular telephone 200n or the like, and register certain information with the site 3. The registered information is stored on a server 4. People who have registered can then connect to the site 3 at any time and access an information provision and exchange service.

In the above-described system 100, a person can select and designate in advance time and/or a specific time period in which to carry on a conversation or exchange information, and therefore is able to participate in a place in which conversations are carried on and information exchanged by connecting to the site 3 at the designated time.

The server 4 searches for parties likely to meet the criteria of the person, based on personal information for persons connecting to the site 3 (that is, information obtained from the persons themselves, including hobbies, preferences, age, sex, and customs, habits). The object of this search is a separate group of people consisting of currently registered members participating in conversation or information exchange. Each participating member is deleted from the participating members when that member's designated time period ends.

When a best party is found for the person, the server 4 connects the two parties' lines and informs both parties that they will each have a telephone call or message transmission.

In this case, temporary e-mail addresses (i.e., addresses that the server 4 renders valid for that site only) of the connecting persons are exchanged, that is, transmitted to both parties. At this stage, the conversation or information exchange is initiated passively at both ends. Neither party actively initiates any telephone call or transmits any information. Rather, the two are simply passively connected by the server 4.

Once a conversation or information exchange is initiated, the server 4 monitors and checks the entire contents of the conversation or information exchange carried out between the two parties. In other words, any data such as voice data, text data or image data (including video, or moving image data) that can be used to identify either of the parties is deleted or changed. That is, if the name or address of a participating person is the same or nearly the same as the person's name, address, place of work, age, etc. mentioned in the conversation it is either erased (so that it cannot be heard) or changed into something completely different (something fictitious). In the case of an e-mail communication as well, the server 4 reads the text data to recognize the above-mentioned information, and either erases or changes that information. Image data attached to the e-mail is either erased (so that it cannot be viewed) or changed. Improvements in server processing speed make it possible to process not only still images but also moving images as image data in the same manner as described above, provided that the moving images are of a speed which can be processed.

Moreover, the system is configured such that connection between participants who know each other (for example, people who are neighbors or who live in the same neighborhood or who attend the same school) and whose identities can be determined by voice or by the content of the information is avoided as much as possible. Additionally, if the consent of the participants is obtained, even the voiceprint and tone or the content of the information can be changed (in the latter case, by changing the punctuation or the way conjunctions and verbs are used, or by inserting dialect from a completely different region).

The above-described arrangements make it possible to render identification of either party impossible, to protect both parties' privacy, to eliminate insecurity and to enable subscribers to carry on a conversation and to exchange information free from confidentiality concerns.

Figure 2A:
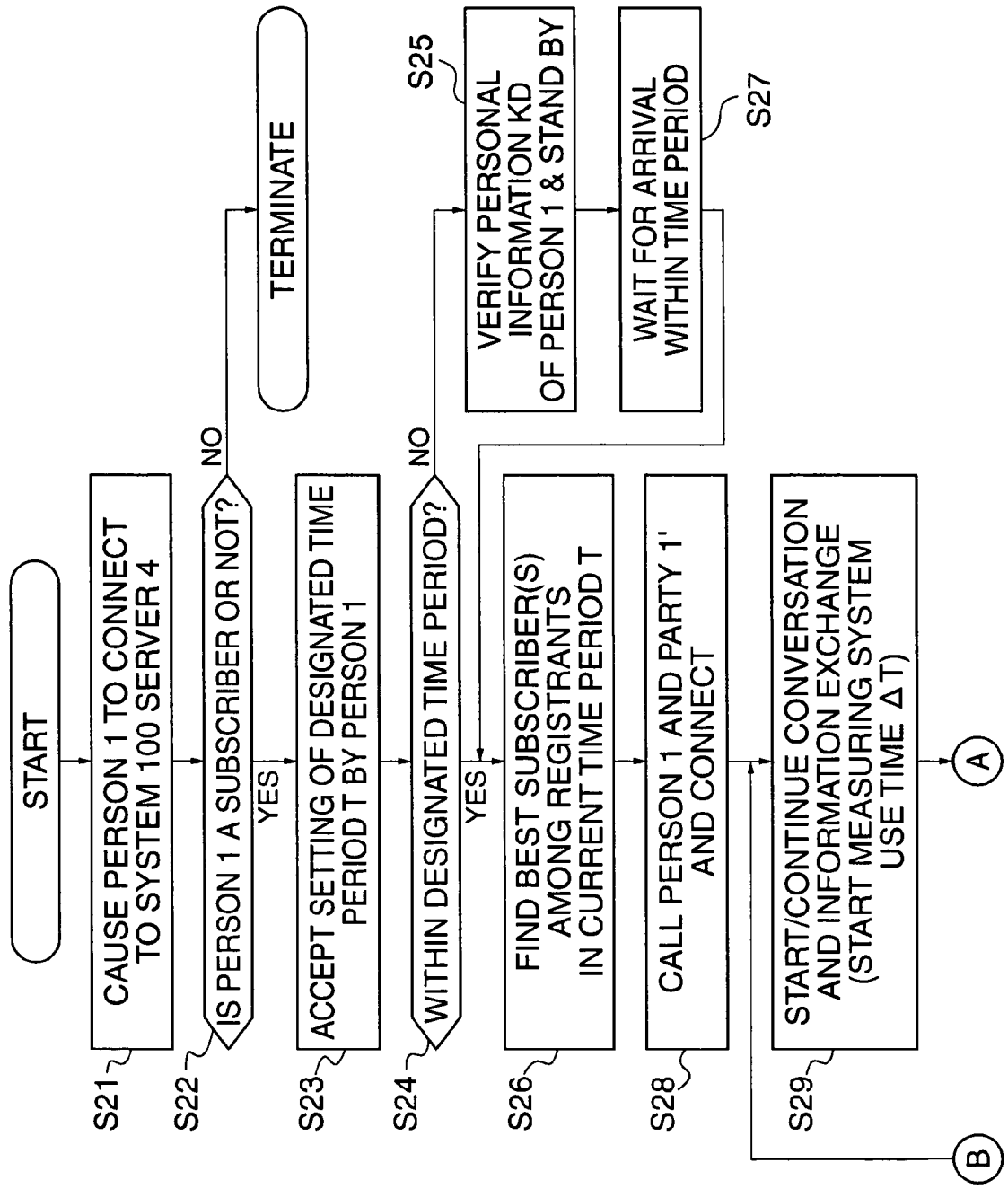
FIGS. 2A and 2B are flow chart showing the procedure of a process performed by the information provision exchange service system 100 (server 4) in FIG. 1.
Figure 2B:
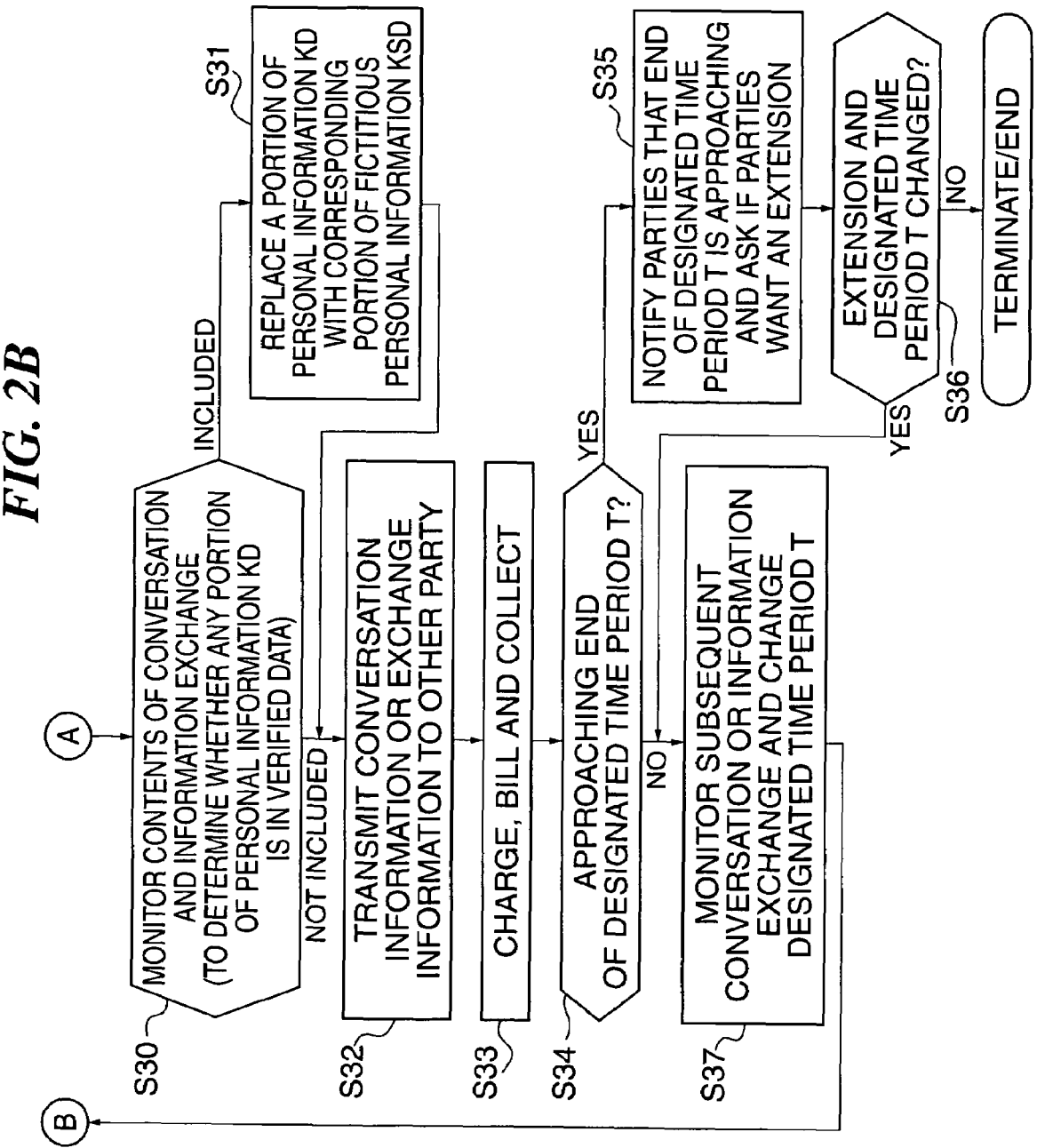
Figure 3:
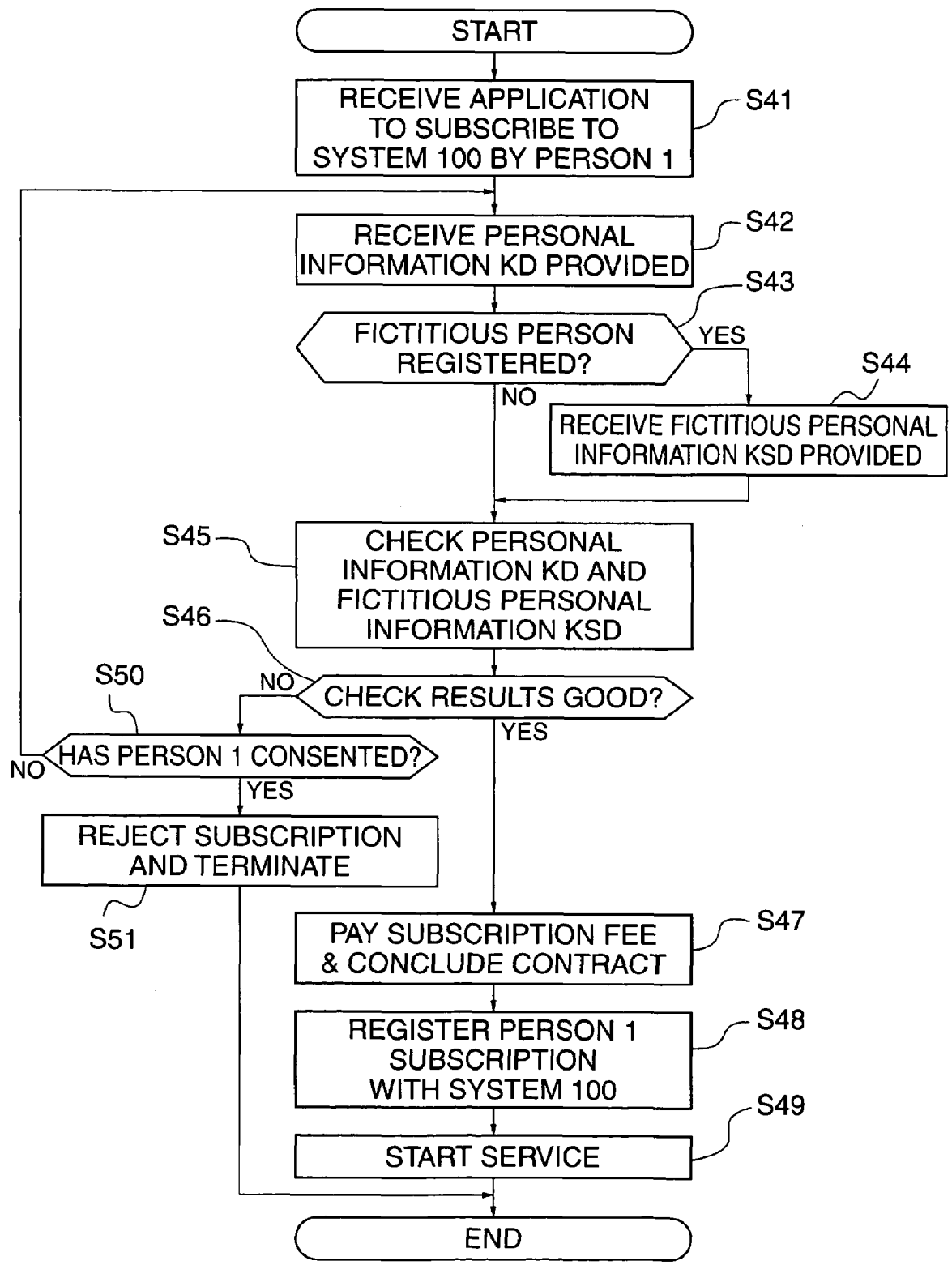
FIG. 3 is a flow chart showing the procedure of a process for registering with the information provision exchange service system 100 (server 4) in FIG. 1.
Figure 4:
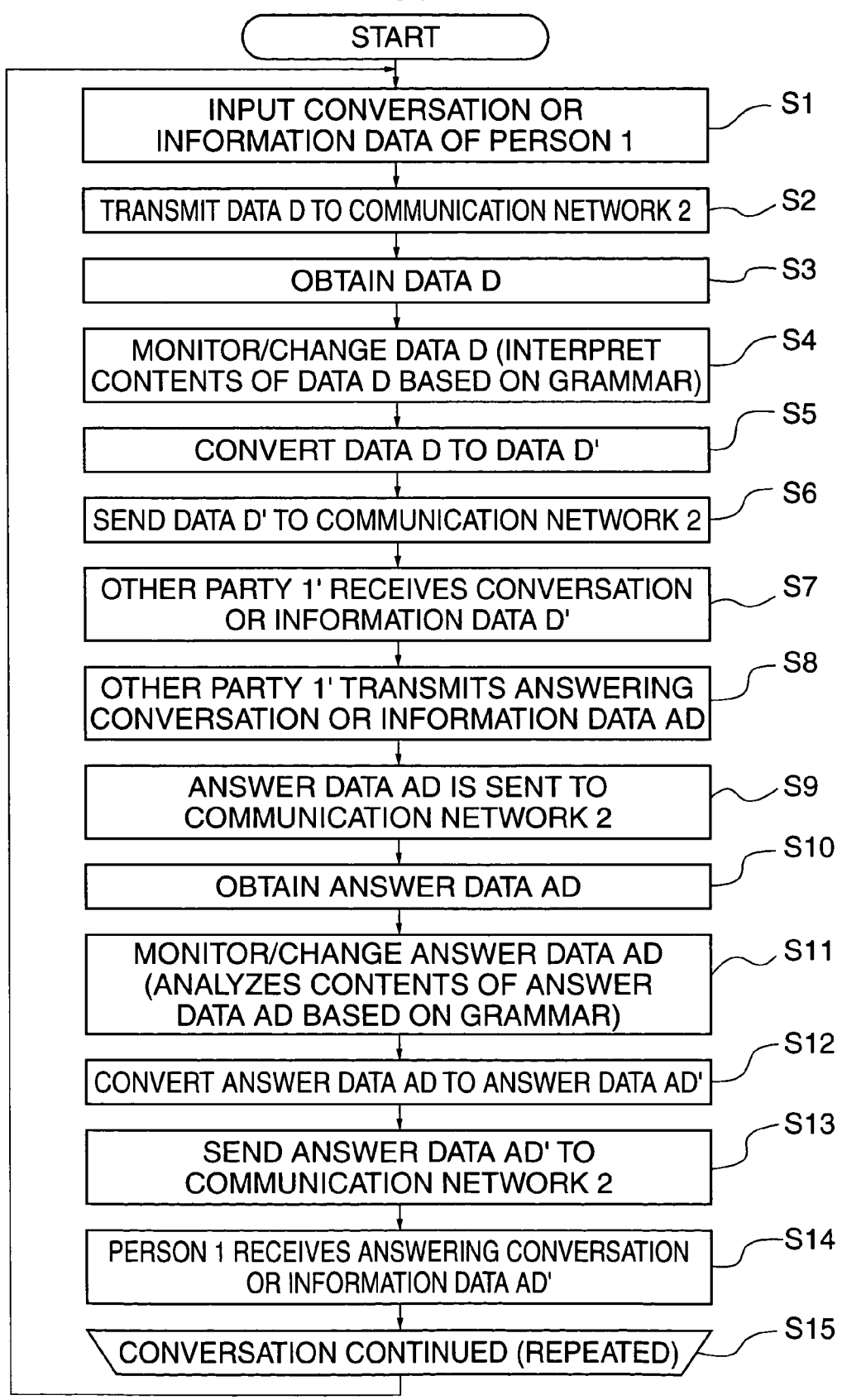
FIG. 4 is a flow chart showing the procedure of a process for replacing a portion of personal information KD with a corresponding portion of fictitious personal information KSD when such portion of personal information KD is included in a conversation or an information exchange.

Next, a detailed description will be given of the processing performed by the present system, with reference to FIGS. 2A, 2B, 3 and 4. FIGS. 2A and 2B are flow chart showing the procedure of a process performed by the information provision exchange service system 100 (server 4) in FIG. 1. FIG. 3 is a flow chart showing the procedure of a process for registering with the information provision exchange service system 100 (server 4) in FIG. 1. FIG. 4 is a flow chart showing the procedure of a process for replacing a portion of personal information KD with a corresponding portion of fictitious personal information KSD when such portion of personal information KD is included in a conversation or an information exchange.

When an individual, for example, person 1, subscribes to the system 100, as shown in FIG. 3, the person 1 first applies to subscribe to the system 100 from a cellular telephone 200 (step S41) and provides personal information KD, including address, name, telephone number, e-mail address, place of work, etc., to the system 100 (step S42). Then, if the person 1 registers a fictitious personage (step S43), that person 1 provides personal information KSD on the fictitious personage to be registered (step S44).

The personal information KD and the fictitious personal information KSD of the person 1 provided as described above is then checked (step S45). This checking involves checking whether or not the fictitious personal information KSD matches information that can be used to identify some other real person, and is carried out using personal information obtained from tax rolls, telephone books and other sources, in order to avoid having the fictitious personal information KSD match information that can be used to identify some other real person. If the results of this check indicate that there is a problem with the personal information KD or the fictitious personal information KSD provided by the person 1 (step S46), then the person 1 is notified to that effect and the person 1 is requested to re-submit the personal information KD, or, if fictitious personal information KSD has been provided, to re-submit the fictitious personal information KSD. If the person 1 agrees to re-submit the above-described personal information KD or fictitious personal information KSD (YES at the step S50), then the processing of the steps S42 et seq. is repeated. By contrast, if the person 1 does not agree to re-submit the above-described personal information KD or fictitious personal information KSD (NO to the step S50), then the subscription of person 1 is rejected and the processing is stopped (step S51), and the process is terminated.

If, however, in the step S46 the results of the check of the personal information KD and fictitious personal information KSD indicate that there is no problem with the information, then the person 1 is directed to pay a subscription fee to the system 100 and conclude a contract (step S47). The provisions of the contract concluded between the person 1 and the system 100 include, but are not limited to, the following items:

(1) The system administrator (including the system 100) shall maintain in strict secrecy the formal submission of personal information KD together with such personal information KD.

(2) In the event that the subscriber's personal information KD appears in conversation or information exchange sites through the system 100, such information shall be erased or changed.

(3) The subscriber shall not converse or exchange information in a way that personal information KD can be analogized only by the other party or identified by indirect methods of expression, for example, by spelling out one's name using a phrase in which every fourth syllable is significant, in the form of a phrase such as "sasuga no sayama no ki nimiru yourou shiten no hiromi ni ko". In this case, the name is "Sasaki Yoshihiko", but the server 4 would deem the expression a fictitious name and transmit it as it is to the other party. The subscriber shall not converse or exchange information using such game-like indirect expressions, and the administrator of the system 100 shall not assume responsibility if the subscriber's personal information KD is identified by the other party through such expressions.

(4) The subscriber shall avoid as much as possible using expressions that can be used to identify an individual. If by mistake such an expression is used, the system 100 shall change such expressions to information included in the fictitious personal information KSD for transmission to the other party. If there is no information equivalent to the fictitious personal information KSD, the system 100 shall erase that portion (i.e., replace it with noise or a blank space).

(5) The administrator shall retain recordings of all subscriber conversations and information exchanges in the system 100 for a certain period of time. Ownership of such recordings shall reside in the system 100 administrator. The subscriber shall be permitted access to only those recordings that record his/her conversations or information exchanges.

(6) The subscriber shall pay the administrator a predetermined fee when the subscriber uses the system 100.

(7) When registering image data or other data as fictitious personal information KSD, the subscriber shall ensure that such fictitious personal information KSD relates to some other, fictitious personage different from the subscriber registered with his or her own personal information KD.

(8) The subscriber shall not conduct commercial transactions, conclude contracts or arrange meetings for a later date through conversations held or information exchanged via the system 100. The system 100 shall assume no responsibility for such activities if arranged.

(9) In the event that two or more subscribers arrange to meet in person, the system 100 shall change the time and place of such meeting.

Next, the server 4 registers the person 1 with the system 100 (step S48) and puts a service for the person 1 as shown in FIGS. 2A, 2B and 4 into a state in which the service can be started (step S49).

When an individual accesses the system 100, as shown in FIG. 2A, first, that individual, for example person 1, connects to the server 4 from the cellular telephone 200 through the communication network 2 (step S21). Then, the server 4 determines whether or not the person 1 is a subscriber (step S22), using, for example, predetermined address or telephone number registration information, voice data or a password address. The process is terminated if it is determined that the person 1 is not a subscriber (NO to the step S22).

On the other hand, if it is determined that the person 1 is a subscriber (YES to the step S22), the server 4 then accepts a setting of a time period T designated by the person 1 in which to receive the system 100 service and registers the person 1 as a subscriber of a group of subscribers to receive the service (step S23). Then, the server 4 determines whether or not the current time is within the registered designated time period T. If the server 4 determines that the current time is not within the registered designated time period T, then the server 4 verifies the personal information KD of the person 1 and moves to a standby mode (step S25) where it awaits the arrival of the designated time period T (step S27). When the current time is within the designated time period T, the process proceeds to a step S26.

If in the above step S24 the server 4 determines that the current time is within the registered designated time period T, then the server 4 permits a conversation or communication to be continued as it is and selects another individual or person 1' as the best partner for the conversation (including information exchange) (the step S26). Here, the person 1 can also set conditions for a partner to take part in the conversation or information exchange. Thus, for example, the person 1 can specify that the target person be female age 20-35, or an "office lady" who has graduated from at least a junior college. It should be noted that the set conditions are ambiguous conditions that cannot be used to identify a subscriber's personal information KD. That is, subscribers cannot specify that the target person be a female age 20-35 who has graduated from a particular junior college in Tokyo, because there is a possibility that such conditions could be used to identify an individual from alumni records or in the course of other conversations or information exchanges. If no target person is found who matches these conditions, then the server is held in the standby mode until such a target person is found. It may also be arranged such that the person 1 is requested to either change or delete the conditions if no target person is found after a predetermined period of time has passed.

Next, the server 4 calls the person 1 and the person 1' who is selected as a partner for the person 1 and connects the two parties so that they can converse or exchange information (step S28). If both parties are using telephones, then the server 4 calls them and the two parties' lines are connected. If the parties are using the Internet or cellular telephone e-mail, then the server 4 provides each party with an e-mail address newly established by the server, thereby enabling the two parties to exchange information. E-mail addresses based on registered fictitious personal information (hereinafter "fictitious e-mail addresses") may be used as the newly established e-mail addresses. For example, the server may change a correct e-mail address that can be used to identify the person and generate a fictitious e-mail address, which the server then uses to put the two parties into contact with each other.

When both parties have been thus connected and are able to converse and exchange information as described above, the server 4 then starts to measure a time period $\Delta T$ over which conversation or information exchange is carried out (step S29). The entire contents of the conversation or information exchange between the two parties is stored in a data recording unit (not shown in the diagram) in the server. Additionally, the server 4 also verifies the contents of the conversation or information exchange using voice verification or text code verification, which are described in detail in Japanese Laid-Open Patent Publication (Kokai) No. 06-161704 and Japanese Laid-Open Patent Publication (Kokai) No. 11-352993. The server 4, while monitoring all the verified data, determines whether or not any portion of a person's personal information KD is provided in the verified data (step S30). If a portion of such personal information KD is in the verified data, then the server replaces that portion with a corresponding portion of fictitious personal information KSD (step S31), thereby securely preventing the inadvertent release of personal information KD between subscribers and enabling subscribers to provide and exchange information between themselves free from confidentiality concerns.

Next, the server 4 transmits the conversation information or exchange information of the person 1 to the other party (if a portion of the personal information KD is included, then this portion is replaced by a corresponding portion of the fictitious personal information KSD) (step S32). Then, the server 4 charges both individuals (the person 1 and the other party 1') conducting the conversation or information exchange a system 100 use fee, and bills and collects the charges accordingly (step S33). In the case of subscribers who contracted to pay all fees themselves (for example, those who strongly desired conversation or information exchange and consented to pay all fees charged for such conversation or information exchange), such subscribers alone are charged and billed accordingly.

A variety of arrangements may be used for collecting charges incurred, including the acceptance of ordinary prepaid telephone cards, automatic debiting of bank accounts in amounts determined by a designated customer fee plan involving a certain specific sum of money for use of a predetermined amount of time or a predetermined volume of data or by a fixed fee plan that allows unlimited use for a fixed fee, or acceptance of a debit card such as a bank debit card or the like that allows instantaneous collection and that is inserted into a terminal or cellular telephone, with instantaneous collection carried out over the network. Alternatively, a temporary account (like a savings account) can be created on the site and the account automatically charged and debited. Charges may be collected by a wide variety of other methods besides those described above.

Next, the server 4 determines whether or not the current time is approaching the end of the registered designated time period T (step S34). If the server 4 determines that the current time is approaching the end of the registered designated time period T, the server notifies the person 1 that the end of the registered designated time period T is approaching and at the same time urges the person 1 to extend or change the designated time period T (step S35). If the other party 1' has the same registered designated time period T as the person 1, the server also similarly notifies the other party 1' that the end of the registered designated time period T is approaching. The server 4 then determines whether or not the person 1 has extended or changed the designated time period T (step S36). If the person 1 has not extended or changed the designated time period T, then the processing is stopped and the process is terminated. At this time, the server 4 informs the other party 1' connected to the person 1 that the allowed time will pass and the conversation or information exchange is to be cut off, and cuts the connection.

If in the step S36 the server 4 determines that the person 1 has extended or changed the designated time period T, then the server monitors the subsequent conversation or information exchange and changes the designated time period T (step S37). The process then returns to the step S29.

If in the step S34 the server 4 determines that the current time is not approaching the end of the registered designated time period T, then the server 4 monitors and changes the contents of the subsequent conversation or information exchange (step S37), and the process returns to the step S29.

It should be noted that, in the process described above, the conversation or information exchange is not limited to one between the person 1 and the other party 1'. Provided that the conditions specified by the person 1' and the other party 1' are such as to allow some other person 1" who satisfies these specified conditions to additionally take part in the conversation or information exchange, such other person 1" may be added as a partner for the conversation or information exchange, enabling a plurality of parties to converse and exchange information as well.

In the present embodiment, as described above, if some portion of personal information KD is included in the conversation or information exchange, that portion is replaced with a corresponding portion of fictitious personal information KSD. A description will now be given of an example in which conversation data (including information exchange) D of the person 1 is transmitted as changed conversation data D', and answering conversation data AD of the other party 1' in reply to the changed conversation data D' is sent as changed data AD'.

As shown in FIG. 4, conversation or information data D of the person 1 is input to the person 1 cellular telephone 200 (step S1). This data D is then transmitted to the communication network 2 (step S2). Then, the server 4 obtains the data D (step S3).

Next, the server 4 translates and interprets the data D and checks its contents (step S4). If the data D contains some portion that should be deleted (that is, a portion corresponding to personal information KD), then the server 4 replaces such portion with a corresponding portion of fictitious personal information KSD, converting the data D to data D' (step S5). The conversation will become unnatural if the above-described portion is simply deleted, giving the other party a jarring feeling. In order to avoid this problem, the server 4 replaces the portion that should be deleted with a corresponding portion of fictitious personal information KSD. For example, if the portion that should be deleted consists of a person's name, then the server changes that name to the name of a fictitious person. Similarly, if the portion that should be deleted consists of an address, then that portion is replaced with a fictitious address. Likewise, if information that can be used to identify a subscriber, such as, for example, age, sex, hobbies, habits, family structure, telephone number, e-mail address, etc., is included in the data D, then this type of personal information KD is replaced with fictitious personal information KSD.

The data D' thus changed as described above is then sent from the server 4 to the communication network 2 and received by the other party 1' (step S7). Answering conversation data AD from the other party 1' in reply to the changed data D' is transmitted (step S8) and sent to the communication network 2 (step S9).

Next, the server 4 obtains the answering conversation data AD (step S10). The server 4 then translates and interprets the answering conversation data AD and checks its contents (step S11). If the data D contains some portion that should be deleted (that is, a portion corresponding to personal information KD), then the server 4 replaces such portion with a corresponding portion of fictitious personal information KSD, converting the data AD to data AD' (step S12).

The data AD' changed as described above is then sent from the server 4 to the communication network 2 (step S13) and received by the person 1 (step S14). Then, the conversation between the person 1 and the other party 1' is continued (step S15).

As described above, according to the present embodiment, a portion of personal information KD is replaced with a corresponding portion of fictitious personal information KSD if some portion of the personal information KD is included in the conversation or information exchange. As a result, people can provide and exchange information with other parties free from confidentiality concerns over the leakage of personal information.

It should be noted that although the present embodiment has been described in terms of voice conversations and text code information exchanges, the present invention is not limited to such terms but can also accommodate the attachment of image data or other text data to Internet e-mail or cellular telephone e-mail. A conversation participant often wishes to make the conversation more interesting by taking image data and inserting into it a portrait or picture of the participant (e.g. the person 1), or inserting scenery, a view or an object. However, the server cannot determine what contents this type of image data has, and even assuming the server 4 could make such a determination, it would necessarily involve enormous amounts of time and expense to do so. In order to solve this problem, the person 1 may register image data that is unrelated to the personal information KD of the person 1 as fictitious personal information KSD (the step S44 in FIG. 3). In this case, if the image data offered for registration consists, for example, of a famous actor or actress, or closely resembles a real person, or is a twin of the person 1, then a decision as to whether or not to register the offered image data is made by the system administrator.

If the face of the other party to a conversation is displayed for example on a cellular telephone as described above, the conversation becomes more enjoyable and more interesting. In particular, these days, cellular telephones themselves are equipped with a color image display function, and so it is possible to view this type of image data. In other words, because the image data displayed here is fictitious personal information KSD, if a 50-year-old female registers the face of a 20-something female, and further, if the woman can sound like a 20-something female when she speaks, then this woman can pass herself off as a 20-something female and enjoy the conversation. Alternatively, if she cannot accomplish the change herself, she can request that the system 100 change her voiceprint and range or voice mode to accomplish the change. If the change has thus been registered and the conversation is a voice conversation, then the server 4 changes the voice generated during a conversation according to the registered contents. If the conversation is of the text-based information exchange type, then the shape of the characters may be changed to a more rounded type favored by schoolgirls, or the words changed to incorporate current slang.

By a method such as this, a 50-year-old female can change herself into a 20-something fictitious female, experience the satisfaction of becoming young again and enjoy a full and pleasant conversation and time.

Alternatively, as another embodiment, the woman may register as a fictitious male. In this case, data such as personal information, sex, and image as a fictitious male is registered as fictitious personal information KSD.

A subscriber may also register as multiple fictitious personages, provided the subscriber pays the additional subscription fees (registration fees) to the administrator of the system 100.

Accordingly, people ranging in age from the aged to children can enjoy conversation in an atmosphere of simple freedom, and have a pleasant time. In particular, children can pass themselves off as adults and learn about society at a level to which they do not normally have access, so the system of the present invention has this advantage as well.

Additionally, lonely aged men can pass themselves off as youths or young females or young children and can have a pleasant time.

Moreover, the server 4 records all the data of these conversations and information exchanges, and retains these records for a predetermined period of time, for example 5 years. This record retention is effective for post-event processing. For example, the conversation or information exchange recorded data can be printed out and verified.

Figure 5:
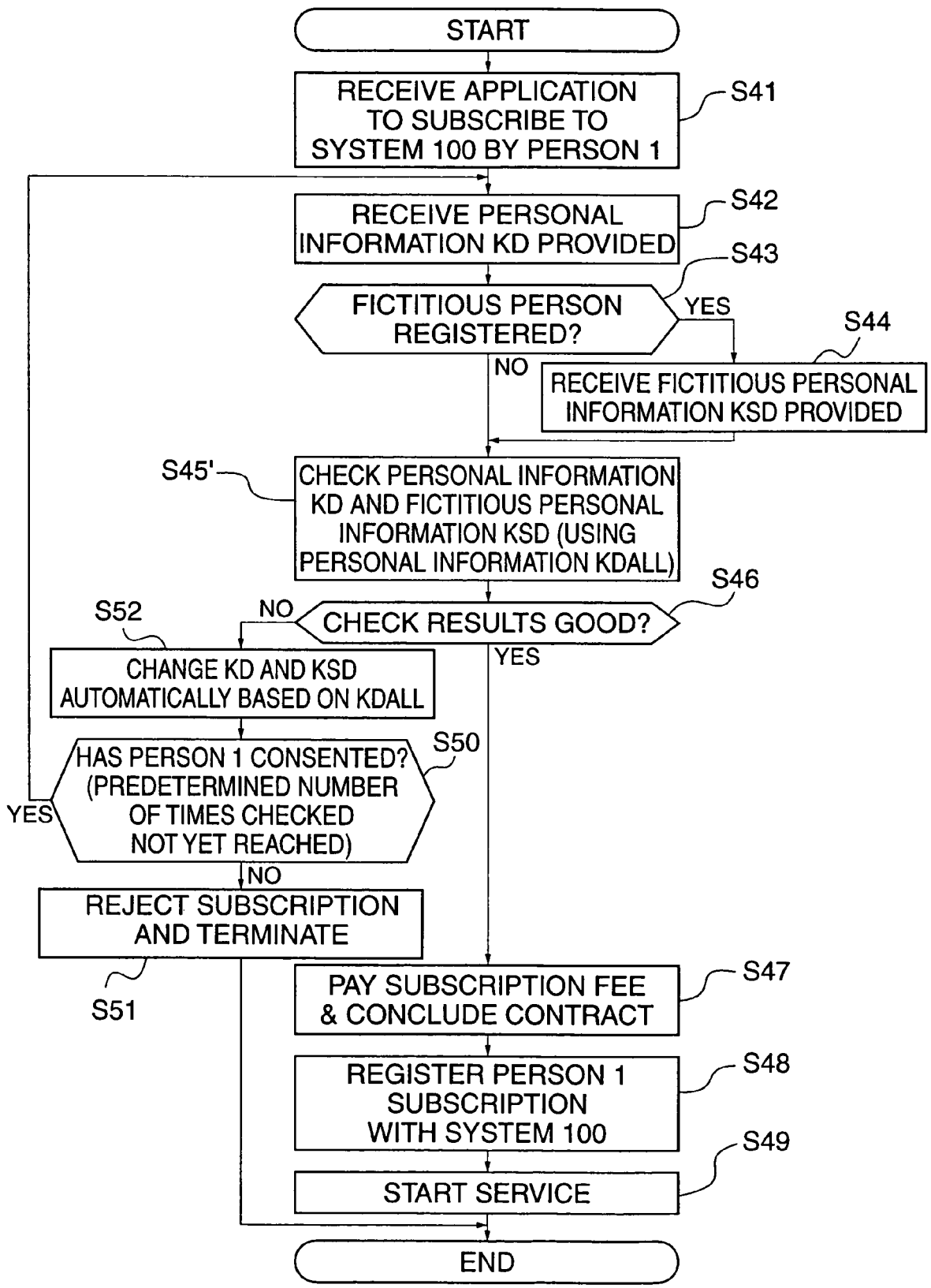
FIG. 5 is a flow chart showing the procedure of a process for registering with the information provision exchange service system according to a second embodiment of the present invention.

Next, a description will be given of a second embodiment of the present invention, with reference to FIG. 5. FIG. 5 is a flow chart showing the procedure of a process for registering with an information provision exchange service system according to the second embodiment of the present invention.

A person 1, when subscribing to the system, becomes a fictitious person and registers fictitious personal information KSD thereof. However, it is clear that the person 1 is a real person who actually exists. Therefore, it is important that the personal information KD that the person 1 registers be dissociated from the fictitious personal information KSD. Accordingly, it is necessary to determine whether or not the personal information KD is correct and to determine whether or not the personal information KD and the fictitious personal information KSD are dissociated based on the correct personal information KD.

Moreover, it is also important, when connecting the person 1 and the other party 1', to determine whether or not the person 1 and the other party 1' know each other or are somehow connected to each other. In this case, making these determinations based only on the personal information KD provided by the parties is sometimes inadequate for the intended purpose.

Accordingly, it is necessary to obtain correct personal information KD, and as a method of doing so there has been proposed a method of using the technology described in Japanese Patent Application No. 2000-365835 (Japanese Laid-Open Patent Publication (Kokai) No. 2002-170104) filed by the present assignee. This method obtains image and voice data on movements of an unspecified number of unidentified individuals with cameras positioned at different locations, accumulates such data as personal information KDALL, compares the personal information KDALL and the personal information KD and, if the two differ greatly, requests that the person change the personal information KD.

In the present embodiment, when an individual applies to subscribe to the system, the system checks the personal information KD provided by the individual to determine whether or not the information is correct using the above-described method.

Specifically, when the person 1 subscribes to the system, as shown in FIG. 5, first, the person 1 applies to subscribe to the system 100 (step S41), providing personal information KD including address, name, telephone number, place of work, etc., to the system 100 (step S42). Then, if the person 1 registers a fictitious person (step S43), the person 1 provides the fictitious personal information KSD to be set the system 100 (step S44).

The personal information KD and the fictitious personal information KSD provided by the person 1 is then checked (step S45') to determine whether or not the proffered information is correct, based on the personal information KDALL. Additionally, the fictitious personal information KSD is checked to determine whether or not it matches another real person who could be identified and whether or not the fictitious personal information KSD and the personal information KD are dissociated. If the results of this check indicate that there is a problem (step S46), the server 4 changes the personal information KD and the fictitious personal information KSD based on the personal information KDALL, and at the same time notifies the person 1 of the change and requests that the person 1 re-submit the personal information KD and fictitious personal information KSD (step S52). The person 1 receiving the request to re-submit the personal information KD and the fictitious personal information KSD then responds indicating whether or not he or she consents to re-submit the information, with the response being transmitted to the server 4.

The server 4 determines whether or not the person 1 has consented to re-submit the personal information KD and the fictitious personal information KSD, based on a reply from the person 1 (step s50). Further, the server 4 determines whether or not the number of checks in the above step S45' exceeds a predetermined number. If the number of checks does not exceeds the predetermined number and at the same time the person 1 has consented to re-submit the personal information KD and the fictitious personal information KSD, the processing in the steps 42 et seq. is repeated until the person 1 again submits the personal information KY and, if required, the personal information KSD (steps S42 to S44). In this case, the person 1 may submit personal information KD and fictitious personal information KSD, both changed based on the personal information KDALL, or may submit new personal information KD and new fictitious personal information KSD. Then, a check is carried out on the re-submitted personal information KD and fictitious personal information KSD (step S45').

If it is determined in the step S50 that the consent of the person 1 is not to be obtained, or if it is determined that the number of checks done in the step S45' exceeds the predetermined number, then the server 4 rejects the application for subscription and terminates the process (step S51).

If in the step S46 the results of the check indicate that there is no problem with the submitted personal information KD and fictitious personal information KSD, then the system 100 is paid the subscription fee, a contract is concluded (step S47) and the server 4 registers the person 1 with the system 100 (step S49).

Moreover, since the present embodiment uses the personal information KDALL in order to determine the compatibility and favorableness of the other party 1' to the conversation or information exchange with the person 1, the best other party 1' for the person 1' can be selected based on the personal information KDALL (step S26).

Moreover, for example, if it is arranged such that that only the voices of the parties to a telecommunications conversation are sent and received, then ambient interference and noise in the parties' conversation can be erased. For example, if Narita Airport flight information guide appears as noise in a conversation though one of the parties has indicated his or her present position is Shibuya, such flight information noise could be used to identify the current location of that party. Accordingly, such background noise is erased or changed to some other type of background noise.

It goes without saying that the object of the present invention may also be accomplished by supplying a system or an apparatus with a storage medium (or a recording medium) in which a program code of software that realizes the functions of either of the above-described embodiments is stored, and causing a computer (or CPU or MPU) of the system or apparatus to read out and execute the program code stored in the storage medium.

In this case, the program code itself read from the storage medium implements the functions of either of the above-described embodiments, and hence the program code and a storage medium on which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above-described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above-described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

As many apparently widely different embodiments of the present invention can be made without departing from the spirit and scope thereof, it is to be understood that the invention is not limited to the specific preferred embodiments described above thereof except as defined in the claims.

What is claimed is:

1. An information provision exchange service system comprising:
    a plurality of communication terminals, each of said communication terminals being allocated to one of a plurality of subscribers;
    a communication network that communicably connects the plurality of communication terminals to each other; and
    a server that mediates information exchange between said plurality of communication terminals via said communication network, said server comprising:
    a registration device that registers both personal information and fictitious personal information for each of a plurality of users using said communication terminals in association with each other, wherein whether or not fictitious personal information to be registered matches the personal information of real people is checked based on personal information of real people, and wherein the registration of the fictitious personal information is performed when the fictitious personal information to be registered does not match the personal information of real people;
    a detection device that checks the registered personal information to determine whether or not information that can be used to identify any of the users of said communication terminals is included in information exchanged between said plurality of communication terminals via said communication network;
    a change request device that is operated when the fictitious personal information and the personal information are not dissociated, to request a change of at least one of the fictitious personal information of the user or the personal information to be registered; and
    a changing device that is operated when said detection device detects based on the registered personal information that the information that can be used to identify any of the users of said communication terminals is included in the information exchanged between said communication terminals via said communication network, to replace the information that can be used to identify the user with a corresponding portion of the registered fictitious personal information.

2. An information provision exchange service system as claimed in claim 1, wherein said detection device performs an identification process on information transmitted from said communication terminals and determines whether or not information corresponding to the personal information registered for any of the users of said particular communication terminals is included in the information transmitted from said communication terminals based on results of the identification process.

3. An information provision exchange service system as claimed in claim 2, wherein: the information exchanged between said plurality of communication terminals via said communication network includes at least one of voice data~1 or text data; and the identification process performed by said detection device comprises identifying the at least one of voice data or text data.

4. An information provision exchange service system as claimed in claim 1, wherein, when no fictitious personal information corresponding to the information corresponding to the personal information is registered, said changing device generates the fictitious personal information corresponding to the information corresponding to the personal information and replaces the information corresponding to the personal information with the generated fictitious personal information.

5. An information provision exchange service system as claimed in claim 1, wherein said server registration device comprises:
    a determining device that determines whether or not the fictitious personal information registered by any of the users and the personal information registered by the user are dissociated.

6. An information provision exchange service system as claimed in claim 1, wherein said registration device comprises:

a storage device that stores user reference personal information obtained from data acquired by an image pickup devices; and a determining device that compares the personal information registered by the users with the user reference personal information and determines whether or not the personal information registered by the users is correct, wherein the change request device is operated when said determining device determines that the personal information registered by any of the users is incorrect, to request a change of the personal information for the user.

7. An information provision exchange service system as claimed in claim 1, wherein said server comprises a communication partner setting device that finds and sets a best communication partner from among the plurality of users, for at least one of the users.

8. An information provision exchange service system as claimed in claim 1, wherein: the information exchanged between said communication terminals via said communication network includes voice data and text data; and said server comprises an expression method changing device that changes a method of expression in the voice data or the text data depending on a related one of the users.

9. An information provision exchange service system as claimed in claim 1, wherein said server comprises a recording device that records information exchanged between said communication terminals via said communication network.

10. An information provision exchange service system as claimed in claim 1, wherein said server comprises a charging device that charges each of the users according to a use time or an amount of information exchanged.

11. A server that mediates information exchange between a plurality of communication terminals via a communication network, the server comprising:

a registration device that registers both personal information and fictitious personal information for each of a plurality of users using the communication terminals in association with each other, wherein whether or not fictitious personal information to be registered matches the personal information of real people is checked based on personal information of real people, and wherein the registration of the fictitious personal information is performed when the fictitious personal information to be registered does not match the personal information of real people;

a detection device that checks the registered personal information to determine whether or not information that can be used to identify any of the users using the communication terminals is included in information exchanged between the communication terminals via the communication network;

a change request device that is operated when the fictitious personal information and the personal information are not dissociated, to request a change of the fictitious personal information to be registered; and a changing device that is operated when said detection device detects based on the registered personal information that the information that can be used to identify any of the users of said communication terminals is detected included in the information exchanged between said communication terminals via said communication network, to replace the information that can be used to identify the user with other a corresponding portion of the registered fictitious personal information.

12. An information provision exchange service provision method of causing a server to mediate information exchange between a plurality of communication terminals via a communication network, to provide an information provision exchange service for a plurality of users using the communication terminals, the method comprising the steps of:

registering both personal information and fictitious personal information for each of the users in association with each other, wherein whether or not fictitious personal information to be registered matches the personal information of real people is checked based on personal information of real people, and wherein the registration of the fictitious personal information is performed when the fictitious personal information to be registered does not match the personal information of real people;

checking the registered personal information to determine whether or not information that can be used to identify any of the users of the communication terminals is included in information exchanged between the communication terminals via the communication network;

requesting a change of the fictitious personal information to be registered when the fictitious personal information and the personal information are not dissociated; and replacing the information that can be used to identify any of the users with a corresponding portion of the registered fictitious personal information when the checking step determines based on the registered personal information that the information that can be used to identify the user is included in the information exchanged between the communication terminals via the communication network.

13. A computer-readable storage medium storing a program for implementing an information provision exchange service provision method of providing an information provision exchange service for users, the program being executable on a computer that mediates information exchange between a plurality of communication terminals via a communication network, the program comprising:

a registration module for registering both personal information and fictitious personal information for each of the users using the communication terminals in association with each other, wherein whether or not fictitious personal information to be registered matches the personal information of real people is checked based on personal information of real people, and wherein the registration of the fictitious personal information is performed when the fictitious personal information to be registered does not match the personal information of real people;

a detection module for checking the registered personal information to determine whether or not information that can be used to identify any of the users using the communication terminals is included in information exchanged between the communication terminals via the communication network;

a change request module that is operated when the fictitious personal information and the personal information are not dissociated, to request a change of the fictitious personal information to be registered; and a changing module for replacing the information that can be used to identify any of the users with other a corresponding portion of the registered fictitious personal information when the information that can be used to identify the user is detected included in the information exchanged between the communication terminals via the communication network.

* * * * *